United States Patent
Montanvert et al.

(10) Patent No.: US 7,118,170 B2
(45) Date of Patent: Oct. 10, 2006

(54) SILL MOULDING FOR A MOTOR VEHICLE

(75) Inventors: Pierre Montanvert, Villeurbanne (FR); Thierry Roussel, Fayl la Foret (FR); Arnold Fayt, Jujurieux (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/936,221

(22) Filed: Sep. 8, 2004

(65) Prior Publication Data
US 2005/0121926 A1 Jun. 9, 2005

(30) Foreign Application Priority Data
Sep. 11, 2003 (FR) .................. 03 10698

(51) Int. Cl.
*B62D 21/15* (2006.01)
(52) U.S. Cl. ........................ 296/209; 296/29
(58) Field of Classification Search ............ 296/209, 296/203.03, 187.12
See application file for complete search history.

(56) References Cited

U.S. PATENT DOCUMENTS

| | | | | | |
|---|---|---|---|---|---|
| 4,292,782 | A | * | 10/1981 | Schaeffer | 52/696 |
| 4,573,707 | A | * | 3/1986 | Pabst | 280/792 |
| 4,848,835 | A | * | 7/1989 | DeRees | 296/204 |
| 5,613,727 | A | * | 3/1997 | Yamazaki | 296/203.03 |
| 6,412,799 | B1 | | 7/2002 | Schrempf | |
| 6,705,668 | B1 | | 3/2004 | Makita | |
| 6,709,137 | B1 | | 3/2004 | Glovak | |
| 2003/0006576 | A1 | | 1/2003 | Lanoue | |
| 2004/0217623 | A1 | * | 11/2004 | Chernoff et al. | 296/146.6 |

* cited by examiner

*Primary Examiner*—Joseph D. Pape
(74) *Attorney, Agent, or Firm*—James R. Williams

(57) ABSTRACT

The present invention relates to a motor vehicle sill moulding including a vertical undulating strip of plastics material and optionally, at least one holding plate.

9 Claims, 2 Drawing Sheets

SILL MOULDING FOR A MOTOR VEHICLE

The present invention relates to a sill moulding for a motor vehicle.

More precisely, the invention relates to a motor vehicle sill moulding including reinforcing means arranged inside the sill moulding.

BACKGROUND OF THE INVENTION

In the state of the art, sill mouldings are already known that are designed mainly to absorb minor impacts such as hitting a curbstone while maneuvering, or a lateral impact against the bumper of another vehicle at low speed.

It is known that the top portion of such a sill moulding can be required to support the weight of a passenger, for example when the passenger stands on it in order to secure an element to the roof of a car, or when the vehicle is high-wheeled and it is necessary to step on the sill moulding in order to climb on board.

In order to avoid the sill moulding sagging, it is common practice to reinforce it by means of internal metal brackets that reinforce the connection between the sill moulding and the body frame of the vehicle. Those brackets are generally fastened to the body frame and to the top portion of the sill moulding.

With such a sill moulding, there is a problem in the event of a violent impact, whereby bending of the sill moulding leads to deformation of the brackets, which then press against the vehicle door and prevent it from opening. Such blocking of doors can be particularly dangerous, especially in the event of the vehicle catching fire.

OBJECTS AND SUMMARY OF THE INVENTION

The invention seeks to remedy this drawback by providing a sill moulding which does not run the risk of jamming a door on being bent.

To this end, the invention provides a motor vehicle sill moulding including reinforcing means arranged inside the sill moulding, wherein the reinforcing means include a vertical undulating strip of plastics material.

Thus, in the event of a relatively minor side impact with the sill moulding being bent, the strip of undulating plastic material deforms and absorbs the impact in elastic manner, without pressing itself against the door. In the event of a more violent impact, the plastics material breaks (unlike metal which deforms plastically), with such rupturing also preventing it from pressing against the door.

Optionally, the reinforcing means of such a sill moulding comprise at least one holding plate.

An advantage of the holding plate is that it supports the top portion of the sill moulding without needing to use a metal bracket, thus avoiding possible blocking of the door. Another advantage of such a holding plate is that it is made of plastics material, which facilitates recycling at the end of the vehicle's life.

A motor vehicle sill moulding of the invention may further comprise one or more of the following characteristics:

the undulating strip of plastics material is made integrally with the holding plate;

the sill moulding includes fastener means for fastening the reinforcing means to the body frame (or Body in White);

the sill moulding includes fastener means for fastening the reinforcing means to the sill moulding;

the fastener means for fastening the reinforcing means to the body frame are arranged on the recesses of the undulating portion; and the reinforcing means include screw-fastening means, catching means, welding means, or adhesive means.

BRIEF DESCRIPTION OF THE DRAWINGS

The invention will be better understood on reading the following description given purely by way of example and made with reference to the accompanying drawings, wherein.

MORE DETAILED DESCRIPTION

Figure 1:
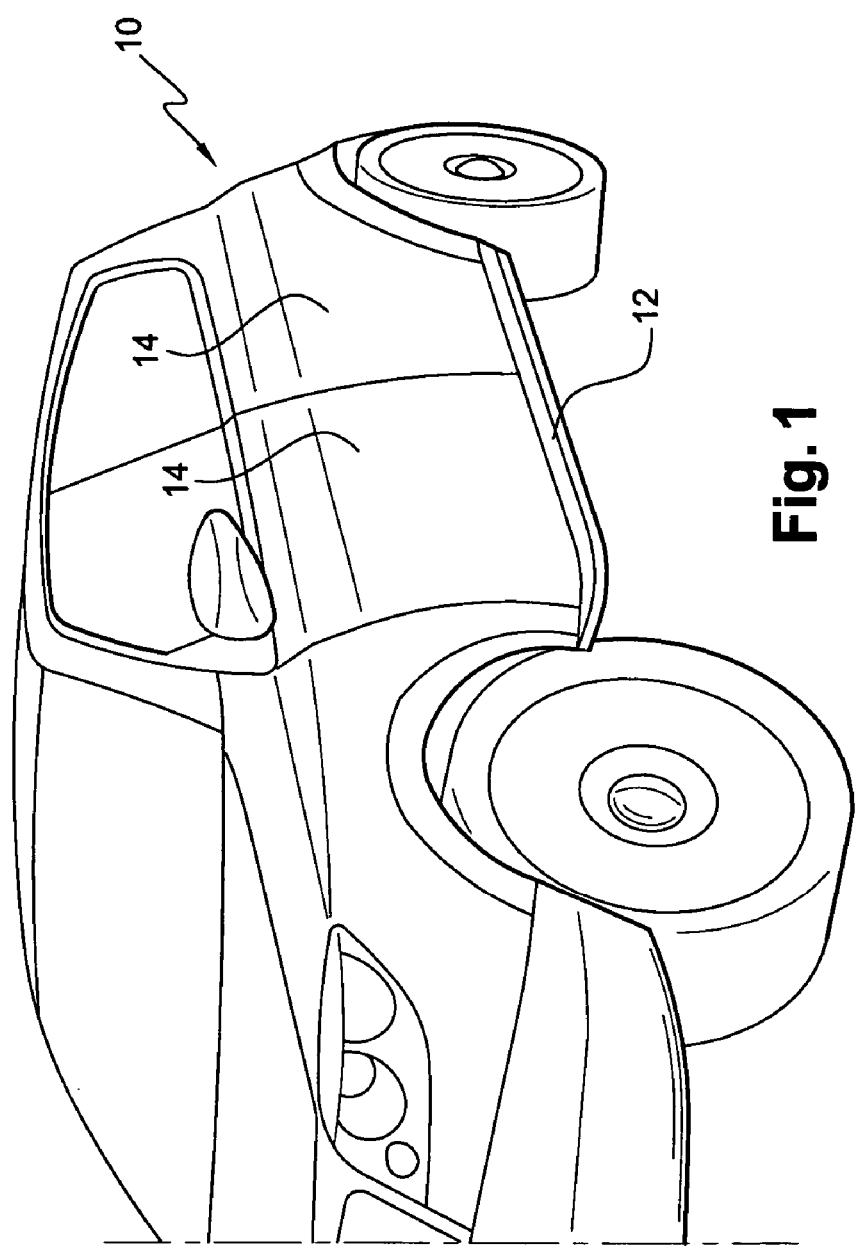
FIG. 1 shows a motor vehicle including a sill moulding of the invention.

FIG. 1 shows a motor vehicle 10 having a sill moulding 12 and side doors 14.

The sill moulding 12 is made of plastics material and is intended to absorb minor impacts, without deforming the plastics material.

Figure 2:
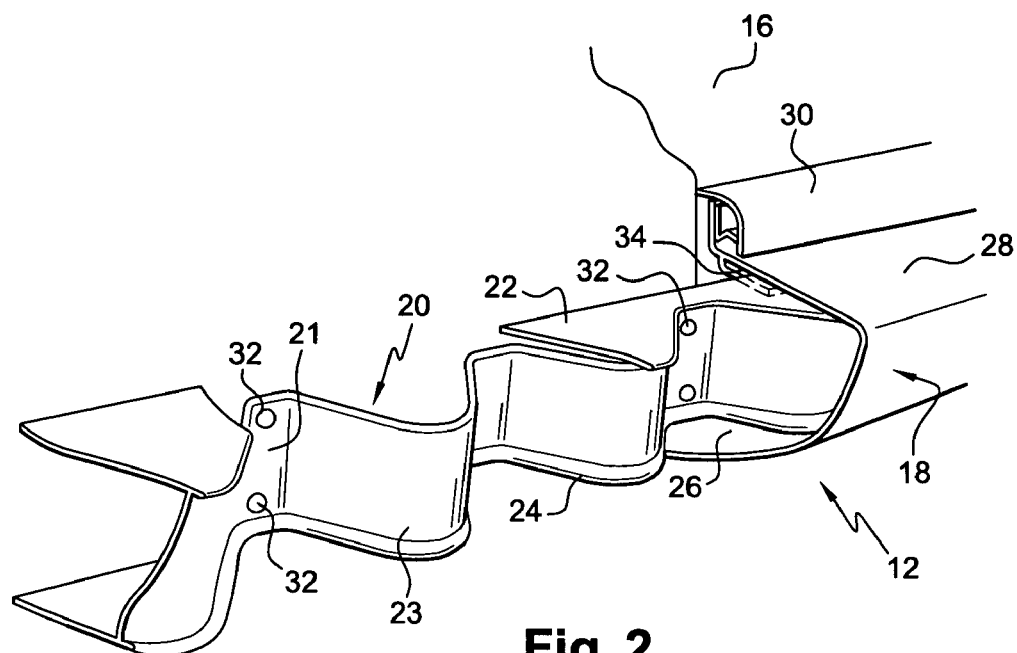
FIG. 2 is a partially cutaway perspective view of a sill moulding constituting a first embodiment of the invention.

In FIG. 2, it can be seen that the sill moulding 12 is secured to the body frame (or Body in White) 16 of the vehicle 10. This sill moulding 12 comprises a casing 18 having reinforcing means arranged therein. The reinforcing means comprise a vertical undulating strip 20, a top holding plate 22, and a bottom holding plate 24.

The undulating strip 20 has undulations oriented so that when seen from above, the undulating strip 20 appears to be substantially sinusoidal. These undulations create recesses 21 for pressing against the body frame 16 of the vehicle, and projections 23 directed towards the outside of the vehicle.

The undulating strip 20 is of plastics material, e.g. including a glass fabric such as that sold under the trademark Twintex. The holding plates 22 and 24 are also of plastics material, e.g. polypropylene, optionally filled with talc.

The undulating strip 20 is held in position by the holding plates 22 and 24 by conventional fastener means such as adhesive, welding, catching, bonding, etc.

The casing 18 of the sill moulding 12 has a bottom portion 26 and a top portion 28, and on the top portion 28, it has a rim 30 for providing continuity between the casing 18 and the body frame 16 of the vehicle 10. The bottom portion 26 and the rim 30 of the casing 18 are secured to the body frame 16 of the vehicle in conventional manner (not shown in the figure).

In addition to these means for securing the casing 18 of the sill moulding 12 to the body frame 16, there are fastener means 32 for fastening the undulating strip 20 to the body frame 16, and fastener means 34 for fastening the holding plate 22 to the casing 18 of the sill moulding 12.

The fastener means 32 are situated in the recesses 21 of the undulating strip 20. They consist in orifices for passing screws or clips to secure the undulating portion 20 to the body frame 16.

The holding plate 22 is fastened to the casing 18 of the sill moulding 12 by conventional fastener means such as clips.

Figure 3:
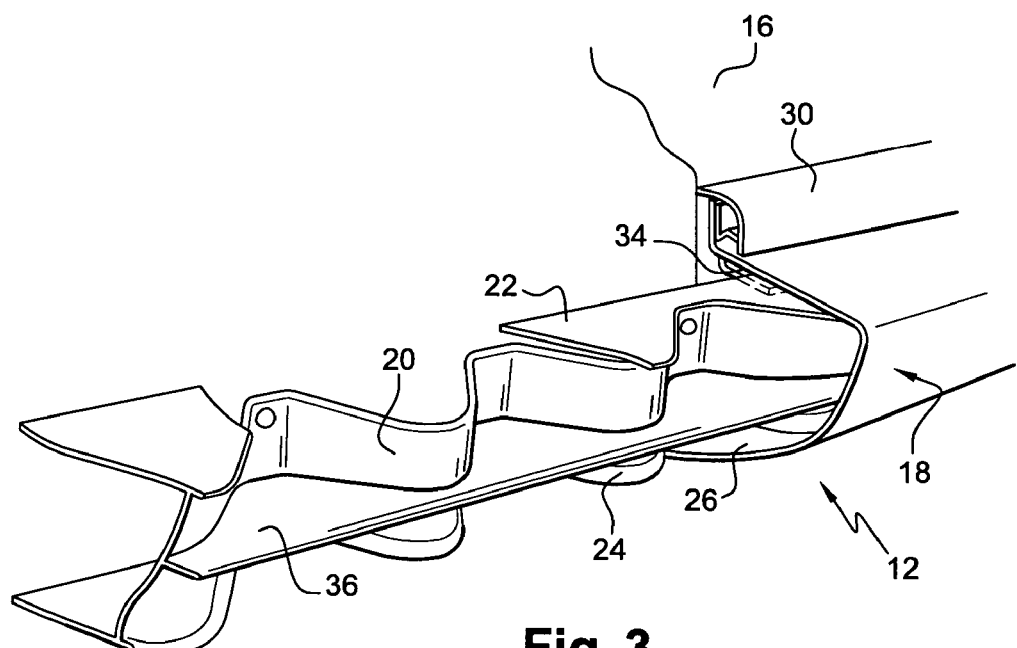
FIG. 3 is a partially cutaway perspective view of a sill moulding constituting a second embodiment of the invention.

In the second embodiment of FIG. 3, there is an additional intermediate holding plate 36 between the two holding plates 22 and 24. This intermediate holding plate 36 serves to reinforce the sill moulding 12. This intermediate holding plate 36 is made of the same material as the top and bottom holding plates 22 and 24.

By means of the invention, in the event of a minor side impact, the undulating strip deforms elastically because of its undulations. Otherwise, in the event of a violent side impact, the sill moulding 12 can become bent, but that will not prevent the doors 14 of the vehicle 10 opening.

Amongst the advantages of the invention, it should be observed that in addition to supporting the top portion 28 of the sill moulding 12 and absorbing side impacts via the undulations 21 and 23, the presence of the undulating strip 20 and of its fastener means 32 for securing it to the body frame 16 ensures that the sill moulding 12 is fastened securely and extensively to the body frame 16.

Finally, it should be observed that the invention is not limited to the embodiments described above.

What is claimed is:

1. A motor vehicle sill moulding including reinforcing means arranged inside the sill moulding, wherein the reinforcing means include a vertical undulating strip of plastics material.

2. A motor vehicle sill moulding according to claim 1, secured to the body frame of the vehicle.

3. A motor vehicle sill moulding according to claim 1, wherein the reinforcing means comprise at least one holding plate.

4. A motor vehicle sill moulding according to claim 3, wherein the holding plate consists of plastics material.

5. A motor vehicle sill moulding according to claim 1, wherein the undulating strip of plastics material is made integrally with the holding plate.

6. A motor vehicle sill moulding according to claim 1, including fastener means for fastening the reinforcing means to the body frame.

7. A motor vehicle sill moulding according to claim 1, including fastener means for fastening the reinforcing means to the sill moulding.

8. A motor vehicle sill moulding according to claim 6, wherein the fastener means for fastening the reinforcing means to the body frame are arranged on a plurality of recesses of the undulating portion.

9. A motor vehicle sill moulding according to claim 6, wherein the fastener means is selected from a group consisting of screw-fastening means, catching means, welding means, and adhesive means.

* * * * *